(12) United States Patent
Zeis

(10) Patent No.: US 12,140,469 B2
(45) Date of Patent: Nov. 12, 2024

(54) AXLE LOAD DETECTION SYSTEM, AXLE SYSTEM AND COMMERCIAL VEHICLE WITH AN AXLE LOAD DETECTION SYSTEM

(71) Applicant: SAF-HOLLAND GmbH, Bessenbach (DE)

(72) Inventor: Tobias Zeis, Bessenbach (DE)

(73) Assignee: SAF-HOLLAND GmbH, Bessenbach (DE)

( * ) Notice: Subject to any disclaimer, the term of this patent is extended or adjusted under 35 U.S.C. 154(b) by 0 days.

(21) Appl. No.: 18/254,508

(22) PCT Filed: Nov. 24, 2021

(86) PCT No.: PCT/EP2021/082818
§ 371 (c)(1),
(2) Date: May 25, 2023

(87) PCT Pub. No.: WO2022/122387
PCT Pub. Date: Jun. 16, 2022

(65) Prior Publication Data
US 2024/0011818 A1    Jan. 11, 2024

(30) Foreign Application Priority Data
Dec. 7, 2020   (DE) ...................... 10 2020 132 445.6

(51) Int. Cl.
*G01G 19/12*      (2006.01)
*B60G 7/02*       (2006.01)
*B60G 11/27*      (2006.01)

(52) U.S. Cl.
CPC ............... *G01G 19/12* (2013.01); *B60G 7/02* (2013.01); *B60G 11/27* (2013.01);
(Continued)

(58) Field of Classification Search
CPC .... B60G 7/02; B60G 11/27; B60G 2202/152; G01G 19/12
See application file for complete search history.

(56) References Cited

U.S. PATENT DOCUMENTS

| | | |
|---|---|---|
| 5,410,109 A | 4/1995 | Tarter et al. |
| 11,397,116 B2 * | 7/2022 | Scott ...................... G01G 19/10 |

(Continued)

FOREIGN PATENT DOCUMENTS

| | | |
|---|---|---|
| DE | 4214785 A1 | 11/1993 |
| DE | 4319080 A1 | 5/1997 |

(Continued)

OTHER PUBLICATIONS

European Patent Office; International Search Report; Jan. 31, 2022; entire document.

*Primary Examiner* — Faye M Fleming
(74) *Attorney, Agent, or Firm* — Price Heneveld LLP

(57) ABSTRACT

Axle load detection system for a commercial vehicle includes a force transmission element and a sensor unit, wherein the sensor unit includes at least one sensor, wherein the force transmission element includes a first assembly area and a second assembly area, wherein the first assembly area is fixed or can be fixed indirectly and/or directly to a vehicle frame of a vehicle of a commercial vehicle, wherein an air spring and/or a control arm is arranged and/or configured to be arranged on the second assembly area, wherein the sensor unit is configured to determine and/or detect a force transmitted via the force transmission element between the first assembly area and the second assembly area in a supporting direction.

20 Claims, 2 Drawing Sheets

(52) U.S. Cl.
  CPC .. *B60G 2202/152* (2013.01); *B60G 2204/111* (2013.01); *B60G 2204/126* (2013.01); *B60G 2204/143* (2013.01); *B60G 2300/04* (2013.01); *B60G 2400/60* (2013.01); *B60G 2401/12* (2013.01)

(56) References Cited

U.S. PATENT DOCUMENTS

| | | | |
|---|---|---|---|
| 2013/0338911 A1* | 12/2013 | Oseguera | G01G 23/3728 |
| | | | 701/124 |
| 2020/0363274 A1 | 11/2020 | Scott | |
| 2021/0008940 A1* | 1/2021 | Andersson | B60G 11/10 |

FOREIGN PATENT DOCUMENTS

| KR | 101519237 B1 | 5/2015 |
|---|---|---|
| WO | 1999005484 A1 | 2/1999 |
| WO | 2019056047 A1 | 3/2019 |

* cited by examiner

AXLE LOAD DETECTION SYSTEM, AXLE SYSTEM AND COMMERCIAL VEHICLE WITH AN AXLE LOAD DETECTION SYSTEM

CROSS-REFERENCE TO RELATED APPLICATIONS

The present application is the U.S. national phase of PCT application PCT/EP2021/082818 filed on Nov. 24, 2021, which claims priority of German Patent Application No. DE 10 2020 132 445.6 filed on Dec. 7, 2020.

BACKGROUND

The invention relates to an axle load detection system, an axle system, and a commercial vehicle having an axle load detection system.

Commercial vehicles are already known from the prior art; they are used to transport a payload from one place to another. In order to ensure the operational safety of the vehicle and at the same time to avoid overloading the track, the axle load must not exceed a certain level. To achieve this, the driver or operator in particular is responsible for monitoring compliance with the maximum axle load. To determine the axle load, a scale is usually used, which must be positioned individually under each axle of the commercial vehicle. This method of determining the axle load is therefore very time-consuming and cost-intensive.

It is therefore the object of the invention to provide a way of determining the axle load in a simple and quick manner.

SUMMARY

According to the invention, an axle load detection system is provided, in particular for a commercial vehicle. In particular, the axle load detection system has a force transmission element and a sensor unit, wherein the sensor unit can have at least one sensor, wherein the force transmission element has a first assembly area and a second assembly area, wherein the first assembly area is fixed or can be fixed indirectly and/or directly to a vehicle frame of a vehicle, in particular of a commercial vehicle, wherein the first assembly area is fixed or can be fixed indirectly and/or directly to a vehicle frame of a vehicle, in particular of a commercial vehicle, wherein an air spring and/or a control arm, in particular a trailing arm, is arranged and/or can be arranged indirectly and/or directly on the second assembly area, wherein the sensor unit is designed to determine and/or detect a force transmitted via the force transmission element between the first assembly area and the second assembly area, in particular in a supporting direction. The axle load detection system according to the invention therefore serves to detect the forces acting on an axle. Advantageously, the axle load detection system is thereby a commercial vehicle axle load detection system. A commercial vehicle in the sense of the invention is in particular a vehicle suitable for road use and/or a vehicle for transporting loads, the commercial vehicle having in particular a permissible total load of more than 3.5 t, preferably of more than 7.5 t and particularly preferably of more than 15 tons. It is particularly advantageous if the utility vehicle is a trailer, especially a semi-trailer. In other words, the axle load detection system can therefore also be a commercial vehicle trailer axle load detection system. In particular, the axle load detection system has a force transmission element. This force transmission element particularly comprises a first assembly area and a second assembly area. By means of the first assembly area, the force transmission element is supported indirectly and/or directly on a vehicle frame of a vehicle, in particular a commercial vehicle. The first assembly area can be designed to be fixed or fixable to a vehicle frame of a vehicle. Advantageously, this fixation may be carried out in a form-locking and/or force-locking manner, in particular using reversible fastening means, such as screws or bolts. Alternatively, or additionally preferably, the fixing, in particular of the first assembly area, can thereby be irreversible, in particular materially locking. Such a material-locking fixing can be achieved, for example, by welding. The second assembly area of the force transmission element is used to absorb forces from an axle support element. Therefore, the second assembly area of the force transmission element is connected, in particular indirectly and/or directly, to an air spring and/or a control arm, in particular a trailing arm, of an axle support. The force transmission element can therefore serve to absorb forces from a control arm or an air spring via the second assembly area and to dissipate them safely into a vehicle frame of a vehicle via the first assembly area. The force transmission element can therefore in particular be a separate additional element or, for example, also be a holding mount on which a trailing arm of a commercial vehicle, in particular of a trailer, can be arranged or is arranged. In addition to the force transmission element, the axle load detection system according to the invention also has a sensor unit, wherein this sensor unit has at least one sensor. In this context, the sensor unit is designed in such a way that this unit can determine and/or detect a force transmitted between the first assembly area and the second assembly area, in particular in the support direction. This unit can be used to determine the force transmitted via the force transmission element. Advantageously, the support direction, in particular in an installed state, of the axle load detection system is directed at least substantially parallel to the direction of the vector of acceleration due to gravity and/or at least substantially parallel to a spring-in and/or spring-out direction of the air spring and/or the axle to be supported. By a "substantially parallel" it is to be understood in particular that the smallest angle between the two relevant directions may be a maximum of 15°, preferably a maximum of 10°, particularly preferably a maximum of 5° and especially strongly preferred a maximum of 1°. Alternatively, or additionally preferably, the support direction can in particular also be the direction in which the air spring of a commercial vehicle performs its inward or outward spring movement. The sensor or the sensors of the sensor unit are thereby arranged in particular in or on the force transmission element in order to achieve a particularly compact and safe arrangement of the sensors. The axle load detection system according to the invention makes it possible to determine or ascertain the axle loads acting on an axle system in a simple and safe manner without the use of scales or other separate components.

Advantageously, the sensor unit has a plurality of sensors. By providing a plurality of sensors, a certain redundancy can be introduced into the system so that the safety of the axle load detection system can be increased. Advantageously, however, all sensors of the sensor unit are thereby designed to determine or to be able to determine at least a part of the force transmitted between the first assembly area and the second assembly area, in particular in the support direction. In other words, this may mean that any sensor of the sensor unit can in particular determine a force and/or a stress, in particular a mechanical stress. For example, such a sensor can therefore be a piezoceramic sensor, a strain gauge, a current sensor and/or a voltage sensor. Advantageously, all sensors of the sensor unit of the axle load detection system are thereby arranged on or in a force transmission element. In other words, the axle load detection system can therefore not only have one force transmission element, but a plurality of force transmission elements, wherein a sensor or a plurality of sensors can be arranged on or in each of these elements. This can provide a particularly reliable measurement of the existing axle loads.

Advantageously, at least one sensor is fixed to and/or in the force transmission element. In other words, this can mean that at least one sensor is arranged on each force transmission element in such a way that it cannot be displaced in relation to the force transmission element. By fixing at least one sensor to each force transmission element in this way, the forces transmitted by the force transmission element between the first assembly area and the second assembly area can be determined in a particularly reliable manner.

Advantageously, the sensors arranged on the force transmission element lie in a plane or are intersected by a plane. In particular, this plane has a normal which is at least essentially parallel to the support direction. This allows the load on the force transmission element to be determined particularly accurately, especially in the support direction. Advantageously, the sensors are arranged on the respective force transmission element or on all force transmission elements in such a way that all sensors lie in a plane or are intersected by a plane that has a normal which is at least substantially parallel to the support direction. However, it is possible that this arrangement of sensors is exclusively present for one force transmission element of the axle load detection system and other force transmission elements have sensors or sensors are arranged on these force transmission elements which do not lie in a plane. However, it is particularly preferred if all force transmission elements of the axle load detection system are designed or arranged in such a way that they—at least for one force transmission element in each case—lie in a plane or are intersected by a plane that has a normal which is at least essentially parallel to the support direction. In this way, a particularly high measuring accuracy can be achieved.

Advantageously, the axle load detection system has a large number of force transmission elements, wherein at least one sensor is arranged on each force transmission element in particular. The use of a large number of force transmission elements, in particular two or three, enables particularly accurate detection of the axle load or the axle forces. Advantageously, the axle load detection system is designed in such a way that at least one force transmission element has a second assembly area, which is arranged indirectly and/or directly on an air spring, and wherein the second assembly area of a further force transmission element is arranged indirectly and/or directly on a control arm, in particular a trailing arm. Advantageously, however, all the force transmission elements are designed and/or arranged in such a way that their first assembly area is fixed or can be fixed to a vehicle frame, and wherein the force transmission elements serve to dissipate an axle load into the vehicle frame. By means of this type of design of the axle load detection system, the supporting forces of the axle can be determined in a particularly reliable manner via the steering element and via the air spring. Advantageously, the axle load detection system is thereby arranged in such a way that all axle forces are transmitted from the axle to a vehicle frame(s) of the vehicle by a force transmission element(s). In other words, this may mean that the axle is connected to the vehicle frame exclusively via force transmission elements, wherein advantageously the respective first assembly areas of these force transmission elements are fixed or arranged indirectly or directly on the supporting vehicle frame of the vehicle. This type of support of an axle or design of the axle load detection system allows all supporting forces of the axle load detection system to be determined in a particularly reliable manner. Therefore, a particularly simple evaluation routine can be implemented, especially for the conversion of the detected mechanical stresses or forces by the sensors of the sensor unit, so that costs can be saved.

In an advantageous manner, at least one sensor, preferably at least two and/or all sensors, of the sensor unit is a static and/or passive sensor, in particular a strain gauge. A static sensor is a sensor which is able to continuously determine or measure a static load. Therefore, in particular a sensor with piezoceramic measuring elements is not a static sensor. A passive sensor, on the other hand, is a sensor that does not generate or produce its own energy, in particular its own voltage. Therefore, a piezoceramic sensor is also not a passive sensor. Advantageously, therefore, one of the sensors, preferably at least two and/or all of the sensors, of the sensor unit and/or of the sensors on one of the force transmission elements can be a strain gauge. Alternatively or additionally preferably, the sensor may also be a resistive force transducer. By using static and/or passive sensors, a static load on the axle can be detected in a particularly simple manner, so that the forces acting on the axle system can be determined in a reliable manner. Alternatively, a piezoceramic element or a dynamic force sensor can also be used, for example, wherein the axle load can be reliably determined in particular by an integration unit.

Advantageously, the force transmission element is in particular made of metal or designed to transmit a force of at least 10 kilo-Newtons (10 000 N), preferably of at least 50 kilo-Newtons (50 000 N) and particularly preferably of 100 kilo-Newtons (100 000 N) between the first assembly area and the second assembly area. By forming the force transmission element from metal, particularly steel, a high force transmission capability between the first and second assembly areas can be achieved. Due to the ability of the force transmission element to transmit a force of at least 10 kN newtons between the first assembly area and the second assembly area, in particular in the supporting direction, the axle load detection system can also be used safely in small commercial vehicles. If the transmittable force between the first assembly area and the second assembly area, in particular in the supporting direction, is at least 100 kN Newton, it can be ensured that the axle load detection system can also be used safely in heavy commercial vehicles, in particular in semitrailers.

It is expedient for the first assembly area to have a first, in particular flat, mounting surface, wherein the first mounting surface has in particular a normal in the support direction, and/or for the second assembly area to have a second, in particular flat, mounting surface, wherein the second mounting surface has in particular a normal in the support direction. In this case, the first mounting surface of the first assembly area serves to make indirect and/or direct contact with a vehicle frame or a supporting surface of a vehicle frame. By forming the first mounting surface in a plane, it can be achieved that even high forces can be transmitted safely without exceeding the permissible surface pressure. Should the first mounting surface be in particular formed in such a way that it has a normal in the supporting direction and or an at least substantially parallel normal to the supporting direction, it can be ensured that no transversely acting forces are introduced into the axle load detection system by contact of the first mounting surface with a supporting surface, in particular of the vehicle frame. Therefore, by forming the first mounting surface in a plane whose normal points at least substantially in the supporting direction, the measurement error occurring in the axle load detection system can be reduced. Alternatively, or additionally preferably, the second assembly area may also have a second mounting surface which is expediently planar, wherein the second mounting surface has in particular an at least substantially parallel normal to the support direction. In this way, the advantages already outlined with respect to the first mounting surface can also be achieved in the second mounting surface. Alternatively, preferably, however, the second assembly area can for example also be formed by a recess area, in particular for receiving a pivot pin for a control arm. Expediently, the above statements with regard to the first and/or the second assembly area thereby apply to a force transmission element and/or to half or the predominant number of the force transmission elements and/or to all force transmission elements of the axle load detection system.

It is expedient that at least one force transmission element is a holding mount and/or wherein at least one force transmission element is an intermediate element, in particular a plate-shaped intermediate element, for mounting between an air spring and a vehicle frame. The design of a holding mount as a force transmission element means that the axle forces transmitted via a steering element can be determined and/or detected by the axle load detection system in a particularly simple manner. A holding mount in the sense of the invention is therefore in particular that element which transmits the forces between a control arm, in particular a trailing arm, and a vehicle frame and/or which supports and/or mounts the control arm. An intermediate element in the sense of the invention is in particular a force transmission element which is arranged in the force flow between the air spring and the vehicle frame. The intermediate element therefore serves in particular, advantageously exclusively, to transmit forces between the air spring and a vehicle frame. An air spring can advantageously have a piston, in particular a plunger, and/or a terminating element, in particular a cover, and/or an air spring bellows. The plunger is used in particular to be able to plunge into a working volume of the air spring during a compression movement. The plunger can be fixed indirectly, in particular via an intermediate element, and/or directly to a vehicle frame or a control arm, for example. The end element, on the other hand, serves to support the air spring relative to a vehicle frame or a control arm and advantageously limits the working volume of the air spring opposite the plunger. An air spring bellows, in particular made of an elastic material such as rubber, is advantageously arranged between the plunger and the end element, wherein the working volume enclosed by the plunger, the end element and the air spring bellows can be compressed and/or reduced by displacing the end element in relation to the plunger, in particular in the support direction. The intermediate element, which is designed as a force transmission element, can be arranged in particular between the piston and the control arm and/or between the piston or the end element of the air spring and the vehicle frame. In other words, the intermediate element can serve to transmit the forces introduced or transmitted by the control arm into the air spring or the forces transmitted or introduced between the air spring and the vehicle frame. Alternatively, or additionally preferably, the end element and/or the plunger may also be designed as a force transmission element. In other words, therefore, in one possible embodiment, the plunger or the end element may be provided with sensors for determining the transmitted forces, in particular in the support direction. This can be done in particular by attaching strain gauges to the plunger. Advantageously, the sensors on the intermediate element and/or on the plunger are arranged in such a way that they lie within a projection of the air spring bellows. In this context, lying within the projection of the air spring bellows means that the projection of the sensors onto a plane perpendicular to the support direction lies within the outer contour of the projection of the air spring bellows into this plane—perpendicular to the support direction. In other words, this may mean that when viewed in the support direction, the sensors or the projections of the sensors would be or are surrounded by the air bellows or the projections thereof. In this way, a particularly compact arrangement of the sensors can be achieved.

In a preferred embodiment, the holding mount has two side walls and an end wall, the side walls being connected to one another by the end wall. The side walls advantageously each have recesses for receiving a pivot pin, wherein a steering element is advantageously pivotably mounted or mountable on this pivot pin. The side walls are connected to one another in particular by the end wall. Advantageously, the end wall and the side walls each have mounting surfaces, wherein it is possible for the mounting surfaces expediently to lie in one plane. In this case, the mounting surfaces serve to be fixed, in particular in a material-locking or force-locking manner, to a vehicle frame. In other words, the mounting surfaces can form the first assembly area or a part thereof. Expediently, the holding mount may thereby be formed as a sheet metal structure and/or as a cast body, wherein it may be expedient, in order to achieve a mechanically loadable structure, to form the holding mount in one piece. By providing a support with two side walls, in particular oriented parallel to one another, and an end wall which is advantageously oriented transversely to the side walls, a particularly cost-effective and mechanically resilient design of the support can be achieved.

In an expedient embodiment, the side walls and/or the end wall of the holding mount form part of the first assembly area, wherein in particular the first mounting surface of the first assembly area forms a distal end, in particular in the direction of the support direction, of the side walls and/or the end wall. In other words, the side walls and/or the end wall of the holding mount can be designed to be fixed indirectly or directly to a vehicle frame. In this way, a particularly safe mechanical transmission of supporting forces between the holding mount and the vehicle frame can be achieved.

Advantageously, the axle load detection system comprises an evaluation unit, wherein the evaluation unit is designed to receive the measurement data from at least one sensor, preferably all sensors, of the sensor unit and/or of the axle load detection system, wherein the evaluation unit is designed to convert the measurement values detected by the sensor into an axle load, in particular using a calibration table and/or a neural network. The evaluation unit can be a separate unit or part of a control unit of the commercial vehicle on which the axle load detection system is mounted. Alternatively, or additionally preferably, the evaluation unit can be designed to transmit the determined and/or recorded loads or data, in particular the axle loads, to a further system and/or control unit, in particular of a vehicle. This transmission can take place, for example, by cable or wirelessly. Alternatively, or additionally preferably, the evaluation unit can also be connected or connectable to a CAN bus. The evaluation unit therefore serves in particular to convert the recorded measured values into a force direction, in particular in the direction of the support. This can be done, for example, by means of a calibration table stored in the evaluation unit and/or by using empirical values and a neural network. By using a calibration table and/or a neural network, it is also possible to use a statically underdetermined or overdetermined system, while still being able to reliably determine the occurring axle loads, especially in the case of a statically overdetermined system.

Preferably, the axle load detection system is designed in such a way that the measured values are and/or can be transmitted wirelessly between the sensor(s) of the sensor unit and the evaluation unit. In other words, the measured value transmission between the sensors of the sensor unit or between the evaluation unit and the sensors can be wireless, so that in particular the assembly effort of the axle load detection system can be reduced. Alternatively, preferably, however, the measured value transmission can also be wired, in particular to reduce the occurrence of noise.

Another aspect of the invention may relate to an axle system, in particular a commercial vehicle axle system. Advantageously, the axle system comprises a control arm, in particular a trailing arm, and an air spring and at least one axle load detection system, in particular as described above and below, wherein the air spring and/or the control arm is arranged indirectly and/or directly on the second assembly area of the force transmission element of the axle load detection system. By such an arrangement, the advantages described above and below can be realized in an axle system.

In an advantageous embodiment of the axle system, the axle load detection system comprises a first force transmission element and a second force transmission element, wherein the air spring is arranged indirectly and/or directly at the second assembly area of the first force transmission element, and wherein the control arm is arranged indirectly and/or directly at the second assembly area of the second force transmission element. In other words, this may mean that the first force transmission element serves to transmit forces between the air spring and the vehicle frame and the second force transmission element serves to transmit forces between the control arm and the vehicle frame. This provision of two force transmission elements, wherein advantageously at least one sensor of the sensor unit is arranged at each of these force transmission elements, can be determined in an advantageous manner both the forces transmitted via the control arm and the forces transmitted via the air spring. Advantageously, the axle system comprises not only a first and a second force transmission element, but also a third and a fourth force transmission element, wherein the first and the second force transmission element are responsible in particular for the—for example—left-hand air spring and the left-hand control arm of an axle, and the third and fourth force transmission elements are responsible in each case—for example—for the right-hand control arm and the right-hand air spring of the axle. By providing four force transmission elements, for example, all supporting force transmission elements of an axle can be detected by the axle load detection system or monitored by the sensors of the sensor unit of the axle load detection system, so that the axle load can be determined in a particularly reliable manner.

In a preferred embodiment, the axle system is designed in such a way that the ratio of the force transmitted by the first force transmission element in the supporting direction to the force transmitted by the second force transmission element in the supporting direction is in a range from 0.3 to 0.65. Hereby, a monitoring of the occurring axle loads can be achieved, which is particularly mechanically loadable. Alternatively, preferably, the ratio can also be in a range from 0.4 to 0.52, in which case a particularly high degree of accuracy of the detection of the transmitted axle loads can also be achieved.

Another aspect of the invention may relate to a commercial vehicle, in particular a commercial vehicle trailer, having an axle system as described above and below, and/or having an axle load detection system as described above and below. In particular, the commercial vehicle trailer may be a semi-trailer. It is expedient that each axle of the commercial vehicle has an axle system as described above or below.

BRIEF DESCRIPTION OF THE DRAWINGS

Further advantages and features will be apparent from the following description concerning preferred embodiments of the subject according to the invention with reference to the accompanying figures. Showing.

DETAILED DESCRIPTION

Figure 1:
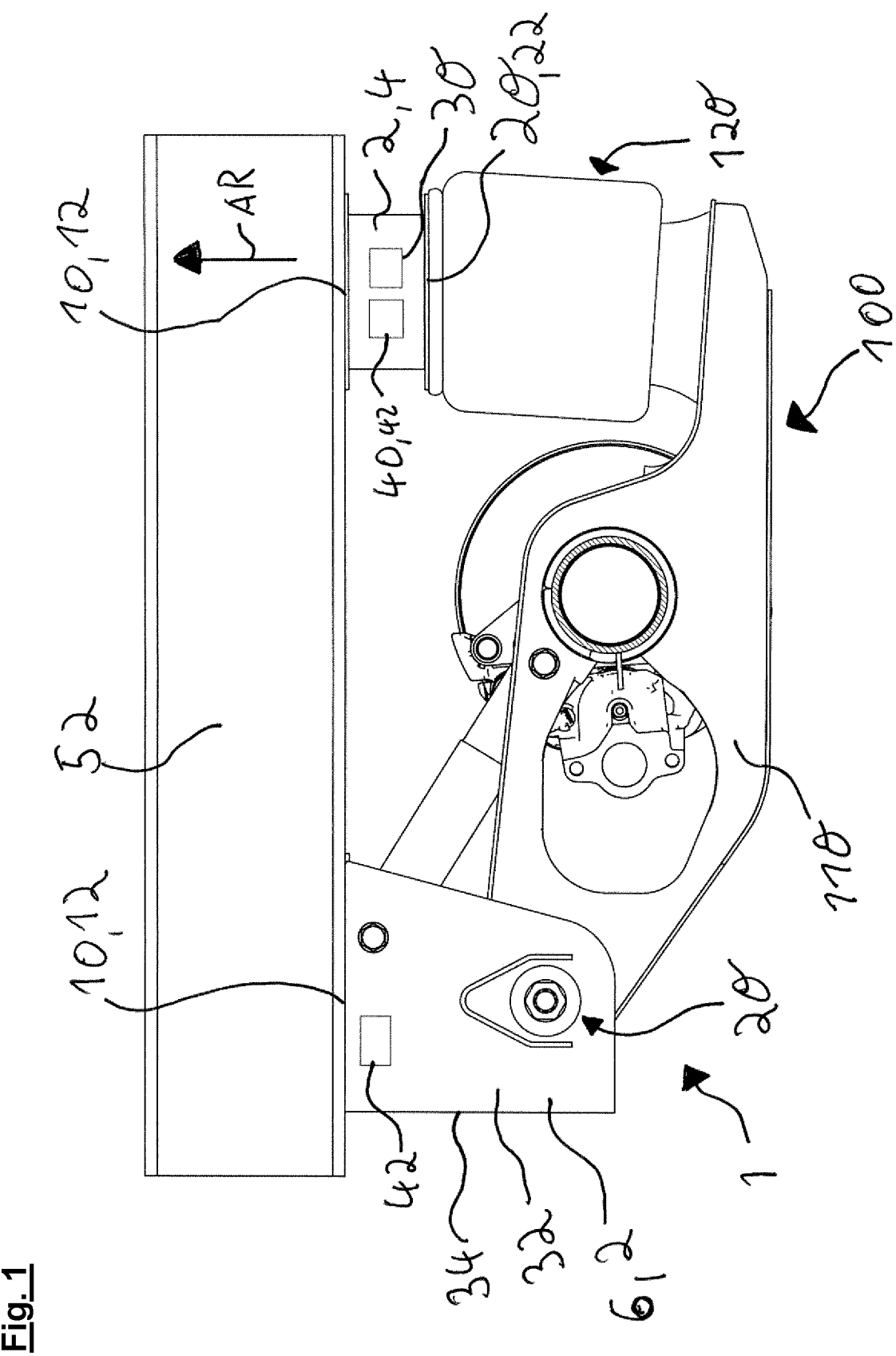
FIG. 1 is a side elevation view of an axle system with an axle load detection system.

FIG. 1 shows an axle system 100 which is used to support an axle, in particular in the support direction AR. The axle system 100 has an axle load detection system 1. The axle load detection system 1 has two force transmission elements 2, wherein one of these force transmission elements 2 is designed as a holding mount 6 and the other force transmission element 2 is designed as an intermediate element 4. The force transmission elements 2 each have a first assembly area 10 and a second assembly area 20. Advantageously, a first mounting surface 12 is arranged or formed in the first assembly area 10 and a second mounting surface 22 is arranged or formed in the second assembly area 20. The force transmission element 2, which is formed as an intermediate element 4, has a first mounting surface 12 in the first assembly area 10 and a second mounting surface 22 in the second assembly area 20, wherein the normals of the planar first mounting surface 12 and of the second mounting surface 22 are formed parallel to the support direction AR. The intermediate element 4 has a first sensor 42 and an evaluation unit 30 on an outer surface. The sensor 42 of the sensor unit 40 is used in this case to determine or detect the forces transmitted, in particular in the support direction AR, by the intermediate element 4 between the first assembly area 10 and the second assembly area 20 between the vehicle frame 52 and the air spring 120. The air spring 120 supports the control arm 110 relative to the vehicle frame 52, in particular in the support direction AR. In the embodiment shown, the control arm 110 is a trailing arm, which can surround the axle to be supported as shown. The control arm 110 is supported on the force transmission element 2, which is designed as a holding mount 6, via its second assembly area 20. The holding mount 6 has two side walls 32, which are connected to each other via the end wall 34. Therefore, each of the side walls 32 has a second assembly area 20. The first assembly area 10 of the force transmission element 2, which is designed as a holding mount 6, supports the holding mount 6 with respect to the vehicle frame 52. The side walls 32 and the end wall 34 each have at least one sensor 42 of the sensor unit 40 of the axle load detection system 1.

Figure 2:
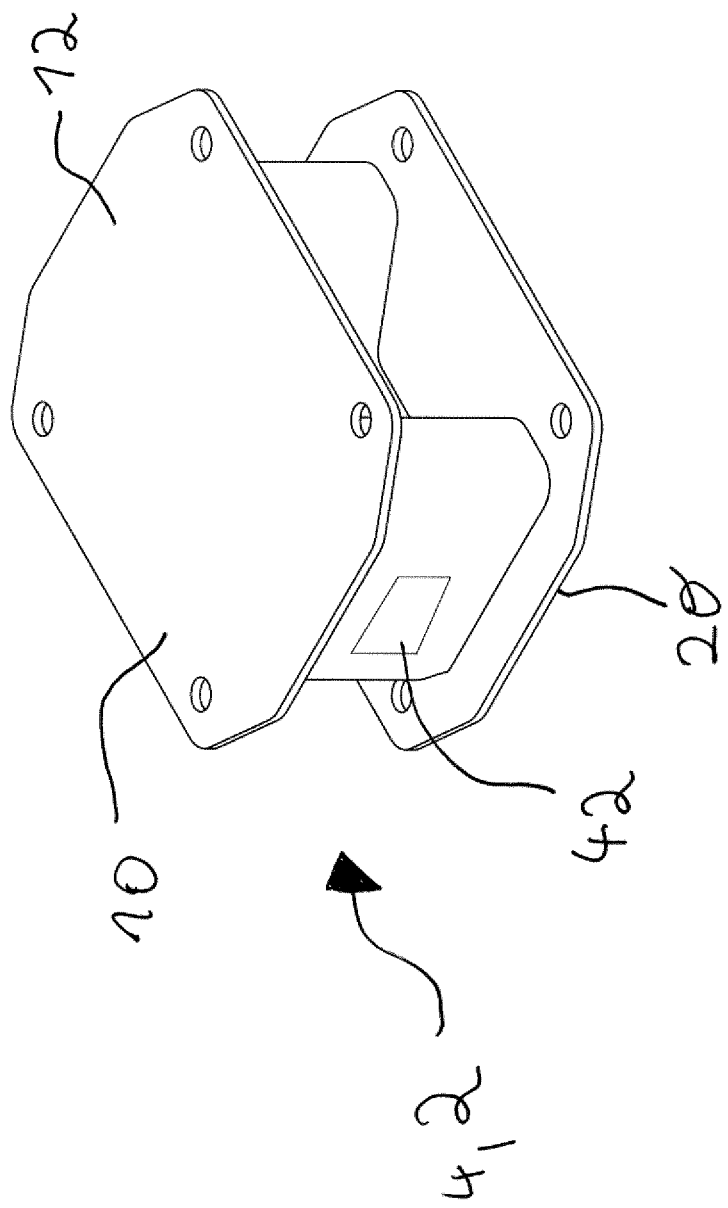
FIG. 2 is a perspective view of a force transmission element in the form of an intermediate element.

FIG. 2 shows an isometric view of a force transmission element 2, which is designed as an intermediate element 4. The intermediate element 4 is supported by the first mounting surface 12 of the first assembly area 10 in an installed state relative to a vehicle frame 52. The second assembly area 20, on the other hand, serves in this case to be connected to an air spring 120 or a holding mount 6 in order to absorb forces from the holding mount 6 or the air spring 120. A sensor 42, which can in particular be a strain gauge, is arranged on an outer surface between the first assembly area 10 and the second assembly area 20.

LIST OF REFERENCE SIGNS

1—axle load detection system
2—force transmission element
4—intermediate element
6—holding mount
10—first assembly area
12—first mounting surface
20—second assembly area
22—second mounting surface
30—evaluation unit
32—side wall
34—end wall
40—sensor unit
42—sensor
52—vehicle frame
100—axle system
110—control arm
120—air spring
AR—support direction

The invention claimed is:

1. A commercial vehicle axle system, comprising:
a control arm comprising a trailing arm;
an air spring; and
at least one axle load detection system for a commercial vehicle that comprises a force transmission element and a sensor unit;
wherein the force transmission element comprises-is a holding mount;
wherein the sensor unit includes at least one sensor;
wherein the force transmission element includes a first assembly area and a second assembly area;
wherein the first assembly area is fixed or configured to be fixed indirectly and/or directly to a vehicle frame of the commercial vehicle;
wherein the sensor unit is configured to determine and/or detect a force transmitted via the force transmission element between the first assembly area and the second assembly area in a support direction; and
wherein the control arm is arranged indirectly and/or directly at the second assembly area of the force transmission element.

2. The axle system according to claim 1, wherein the at least one sensor includes a plurality of sensors.

3. The axle system according to claim 2, wherein the plurality of sensors are arranged on the force transmission element and lie in a plane or are intersected by a plane having a normal which is at least substantially parallel to the support direction.

4. The axle system according to claim 1, wherein at least one sensor is fixed to and/or in the force transmission element.

5. The axle system according to claim 1, wherein the force transmission element is one of a plurality of force transmission elements, and wherein the at least one sensor is arranged on each force transmission element.

6. The axle system according to claim 1, wherein the at least one sensor of the sensor unit comprises a static or passive sensor.

7. The axle system according to claim 6, wherein the at least one sensor comprises a strain gauge.

8. The axle system according to claim 1, wherein the force transmission element comprises metal and/or is configured to apply a force of at least 10 kN between the first assembly area and the second assembly area.

9. The axle system according to claim 8, wherein the force is at least 50 kN.

10. The axle system according to claim 9, wherein the force is at least 100 kN.

11. The axle system according to claim 1, wherein the first assembly area has a flat first mounting surface and wherein the first mounting surface has a normal in the support direction, and/or wherein the second assembly area has a flat second mounting surface and wherein the second mounting surface has a normal in the support direction.

12. The axle system according to claim 1, wherein at least one force transmission element includes a plate-shaped intermediate element configured to mount between the air spring and the vehicle frame.

13. The axle system according to claim 1, wherein the holding mount has two side walls and an end wall, and wherein the side walls are connected to each other by the end wall.

14. A commercial vehicle axle system, comprising:
a control arm comprising a trailing arm;
an air spring; and
at least one axle load detection system for a commercial vehicle that comprises a force transmission element and a sensor unit;
wherein the force transmission element comprises a holding mount;
wherein the sensor unit includes at least one sensor;
wherein the force transmission element includes a first assembly area and a second assembly area;
wherein the first assembly area is fixed or configured to be fixed indirectly and/or directly to a vehicle frame of the commercial vehicle;
wherein the sensor unit is configured to determine and/or detect a force transmitted via the force transmission element between the first assembly area and the second assembly area in a support direction;
wherein the control arm is arranged indirectly and/or directly at the second assembly area of the force transmission element; and
wherein the axle load detection system further comprises an evaluation unit that is configured to receive measurement data from at least one sensor and to convert the measurement data from the at least one sensor into an axle load using a calibration table.

15. The axle system according to claim 1, wherein the force transmission element is one of a pair of force transmission elements including a first force transmission element and a second force transmission element, wherein the air spring is arranged indirectly and/or directly on the second assembly area of the first force transmission element, and wherein the control arm is arranged indirectly and/or directly on the second assembly area of the second force transmission element.

16. The axle system according to claim 1, wherein the axle system is configured such that a ratio of the force transmitted by the first force transmission element in the supporting direction to the force transmitted by the second force transmission element in the supporting direction is in a range of 0.3 to 0.65.

17. A commercial vehicle trailer that includes the axle system according to claim 1.

18. An axle system, comprising:
a trailing arm; and
an air spring configured to be positioned between the trailing arm and a frame member of a vehicle; and
at least one axle load detection system, comprising:
a force transmission element that includes a holding mount; and
a sensor unit that includes at least one sensor;
wherein the force transmission element includes a first assembly area configured to be fixed to the vehicle frame and a second assembly area configured to be fixed to the air spring; and
wherein the sensor unit is configured to detect a force transmitted via the force transmission element between the first assembly area and the second assembly area; and
wherein the trailing arm is arranged at the second assembly area of the force transmission element.

19. The axle system according to claim 18, wherein the force is in a direction and wherein the at least one sensor is arranged on the force transmission element lies in a plane or is intersected by a plane having a normal which is at least substantially parallel to the support direction.

20. The axle system according to claim 18, is configured to apply a force of at least 10 kN between the first assembly area and the second assembly area.

* * * * *